US011277218B2

United States Patent
Zhang et al.

(10) Patent No.: US 11,277,218 B2
(45) Date of Patent: Mar. 15, 2022

(54) RESOURCE UNIT SETTING METHOD, RESOURCE UNIT TRANSMISSION METHOD, AND APPARATUS

(71) Applicant: HUAWEI TECHNOLOGIES CO., LTD., Guangdong (CN)

(72) Inventors: Xi Zhang, Chengdu (CN); Minghui Xu, Chengdu (CN); Huang Huang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 85 days.

(21) Appl. No.: 16/688,212

(22) Filed: Nov. 19, 2019

(65) Prior Publication Data

US 2020/0092032 A1    Mar. 19, 2020

Related U.S. Application Data

(63) Continuation of application No. PCT/CN2018/090258, filed on Jun. 7, 2018.

(30) Foreign Application Priority Data

Jun. 16, 2017 (CN) ................. 201710458546.5

(51) Int. Cl.
*H04L 1/00* (2006.01)
*H04W 76/27* (2018.01)
(Continued)

(52) U.S. Cl.
CPC ........... *H04L 1/0003* (2013.01); *H04B 15/00* (2013.01); *H04L 5/0007* (2013.01);
(Continued)

(58) Field of Classification Search
CPC ..... H04B 15/00; H04L 1/0003; H04L 5/0007; H04L 5/0051; H04W 72/042; H04W 76/27; H04W 80/02
See application file for complete search history.

(56) References Cited

U.S. PATENT DOCUMENTS 7,184,485 B2 * 2/2007 Balakrishnan ......... H04B 1/719
370/208
7,668,265 B2 * 2/2010 Balakrishnan ...... H04L 27/2613
375/346
(Continued)

FOREIGN PATENT DOCUMENTS

CN    101388720 A    3/2009
CN    101969694 A    2/2011
(Continued)

OTHER PUBLICATIONS

Unknown, LTE Physical Layer Overview, archived at Wayback Machine (https://web.archive.org/web/20170510123442/https://rfmw.em.keysight.com//wireless/helpfiles/89600B/webhelp/subsystems/lte/Content/lte_overview.htm) having a capture data of May 10, 2017 (Year: 2017).*

(Continued)

*Primary Examiner* — Eric Nowlin
(74) *Attorney, Agent, or Firm* — Womble Bond Dickinson (US) LLP

(57) ABSTRACT

This application discloses a resource unit setting method, a resource unit transmission method, and an apparatus. The method includes: setting, by a transmit end device based on a setting threshold of a null resource unit and/or a scheduling parameter, a plurality of null resource units at time domain and/or frequency domain locations associated with phase tracking reference signal resource units of one or more OFDM symbols; and sending, by the transmit end device, the one or more OFDM symbols. The corresponding appa- (Continued)

ratus is further disclosed. In the technical solution of this application, the null resource unit is set based on the setting threshold of the null resource unit and/or the scheduling parameter. Demodulation accuracy of a high-frequency communications system is ensured, and overheads of the null resource unit are as low as possible, thereby improving spectrum efficiency.

14 Claims, 8 Drawing Sheets

(51) Int. Cl.
*H04B 15/00* (2006.01)
*H04L 5/00* (2006.01)
*H04W 72/04* (2009.01)
*H04W 80/02* (2009.01)

(52) U.S. Cl.
CPC ......... *H04L 5/0051* (2013.01); *H04W 72/042* (2013.01); *H04W 76/27* (2018.02); *H04W 80/02* (2013.01)

(56) References Cited

U.S. PATENT DOCUMENTS

| | | | |
|---|---|---|---|
| 8,472,555 B2* | 6/2013 | Balakrishnan | H04B 1/719 375/296 |
| 8,665,992 B1 | 3/2014 | Eliaz | |
| 9,030,992 B2* | 5/2015 | Kuchi | H04L 25/03019 370/328 |
| 10,057,026 B2* | 8/2018 | Jones, IV | H04L 27/2657 |
| 10,200,990 B2* | 2/2019 | Hugl | H04W 72/042 |
| 10,560,243 B2* | 2/2020 | Bai | H04L 27/2695 |
| 10,594,382 B2* | 3/2020 | Zhang | H04B 7/0486 |
| 10,727,996 B2* | 7/2020 | Nam | H04L 5/0007 |
| 10,868,607 B2* | 12/2020 | Zhang | H04B 7/0478 |
| 2004/0166887 A1 | 8/2004 | Laroia et al. | |
| 2006/0008016 A1* | 1/2006 | Balakrishnan | H04L 27/2626 375/260 |
| 2006/0008017 A1* | 1/2006 | Balakrishnan | H04L 27/2626 375/260 |
| 2008/0043860 A1 | 2/2008 | Moffatt | |
| 2009/0067476 A1 | 3/2009 | Kawabata et al. | |
| 2010/0246376 A1* | 9/2010 | Nam | H04L 5/0051 370/208 |
| 2011/0058626 A1* | 3/2011 | Balakrishnan | H04L 27/2613 375/296 |
| 2012/0014476 A1* | 1/2012 | Kuchi | H04L 25/0232 375/296 |
| 2013/0039299 A1 | 2/2013 | Papasakellariou et al. | |
| 2015/0117390 A1 | 4/2015 | Inoue et al. | |
| 2016/0286404 A1* | 9/2016 | Rico Alvarino | H04L 5/001 |
| 2016/0345304 A1 | 11/2016 | Qu et al. | |
| 2017/0134134 A1* | 5/2017 | Lee | H04W 72/042 |
| 2018/0049189 A1* | 2/2018 | Hugl | H04L 5/0094 |
| 2018/0205528 A1* | 7/2018 | Bai | H04L 27/2601 |
| 2018/0359069 A1* | 12/2018 | Nam | H04L 5/0048 |
| 2019/0140729 A1* | 5/2019 | Zhang | H04B 7/0669 |
| 2020/0007369 A1* | 1/2020 | Ciochina-Duchesne | H04L 27/2636 |
| 2020/0021405 A1* | 1/2020 | Zhu | H04L 1/0068 |
| 2020/0083996 A1* | 3/2020 | Hunukumbure | H04L 5/0035 |
| 2020/0084788 A1* | 3/2020 | Li | H04L 5/0051 |
| 2020/0092032 A1* | 3/2020 | Zhang | H04L 5/0051 |
| 2020/0107307 A1* | 4/2020 | Nammi | H04B 7/0626 |
| 2020/0186226 A1* | 6/2020 | Zhang | H04B 7/0689 |
| 2020/0244503 A1* | 7/2020 | Bala | H04L 5/0007 |
| 2020/0374883 A1* | 11/2020 | Chen | H04L 5/10 |
| 2021/0044402 A1* | 2/2021 | Gao | H04L 5/0048 |
| 2021/0058207 A1* | 2/2021 | Lee | H04L 5/0053 |
| 2021/0068130 A1* | 3/2021 | Liu | H04B 1/713 |

FOREIGN PATENT DOCUMENTS

| | | |
|---|---|---|
| CN | 103843433 A | 6/2014 |
| CN | 106664280 A | 5/2017 |
| WO | 2013022261 A2 | 2/2013 |

OTHER PUBLICATIONS

Intel Corporation: "On PT-RS for CP-OFDM",3GPP Draft; R1-1707366,May 14, 2017,total 8 pages.
Cisco et al,TS V5G.211 V1.7 (Oct. 2016),Verizon 5G TF;Air Interface Working Group;Verizon 5th Generation Radio Access;Physical channels and modulation(Release 1),total 83 pages.
W0ASIS: "Multi-Cell CSI-RS with Network Subband",3GPP Draft; R1-094908,Nov. 3, 2009,total 7 pages.
Cisco et al,TS V5G.212 V1.5 (Sep. 2016),Verizon 5G TF;Air Interface Working Group;Verizon 5th Generation Radio Access;Multiplexing and channel coding(Release 1),total 62 pages.
Intel Corporation: "On Interference Measurement for CSI",3GPP Draft; R1-1702207,Feb. 12, 2017,total 5 pages.
Cisco et al.,TS V5G.213 v1.4 (Oct. 2016),Verizon 5G TF;Air Interface Working Group;Verizon 5th Generation Radio Access;Physical layer procedures(Release 1),total 50 pages.

* cited by examiner

RESOURCE UNIT SETTING METHOD, RESOURCE UNIT TRANSMISSION METHOD, AND APPARATUS

CROSS-REFERENCE TO RELATED APPLICATIONS

This application is a continuation of International Application No. PCT/CN2018/090258, filed on Jun. 7, 2018, which claims priority to Chinese Patent Application No. 201710458546.5, filed on Jun. 16, 2017. The disclosures of the aforementioned applications are hereby incorporated by reference in their entireties.

TECHNICAL FIELD

This application relates to the field of communications technologies, and in particular, to a resource unit setting method, a resource unit transmission method, and an apparatus.

BACKGROUND

With an increasing communication requirement, a next-generation wireless communications network (such as a 5th generation mobile communication ( )) that operates at a frequency band above 6 GHz may provide an ultra-high-speed data communications service. Within a frequency range above 6 GHz, frequency bands that can be used in the next-generation wireless communications network include frequency bands at 28 GHz, 39 GHz, 60 GHz, 73 GHz, and the like. A high-frequency communications system above 6 GHz has notable features such as a high bandwidth and a highly-integrated antenna array. Therefore, a relatively high throughput is easy to implement. In addition, in comparison with an existing wireless communications network, the high-frequency communications system is subject to more serious intermediate radio frequency distortion, especially impact brought by a phase noise (PHN). In addition, impact brought by a Doppler effect and a carrier frequency offset (CFO) on performance of the high-frequency communications system is also aggravated as a frequency band is located at a higher location. A common feature of the phase noise, the Doppler effect, and the CFO is that a phase error or referred to as phase deviation is introduced to data receiving of the high-frequency communications system, and consequently the performance of the high-frequency communications system degrades and even the high-frequency communications system cannot operate.

The phase noise is used as an example. As a frequency band increases, a phase noise level deteriorates by 20*log (f1/f2). FIG. 1 is a schematic diagram of impact of different phase noises on constellation points. A 2G frequency band and a 28G frequency band are used as examples. The left figure is a schematic diagram of constellation points in a case of no phase noise, the middle figure is a schematic diagram of impact of a phase noise at the 2G frequency band on the constellation points, and the right figure is a schematic diagram of impact of a phase noise at the 28G frequency band on the constellation points. It can be seen that a phase noise level at the 28G frequency band is 23 dB higher than that at the 2G frequency band. A higher phase noise level indicates greater impact on a received signal.

In addition, in the next-generation wireless communications network above 6G to meet an increasing communication requirement, a requirement for higher order modulation such as 256QAM or even 1024QAM becomes increasingly high. In this case, in addition to a common phase error (CPE), inter-carrier interference (ICI) caused by the phase deviation also cannot be ignored. FIG. 2 is a schematic diagram of impact of a common phase error and inter-carrier interference on modulation order constellation points. The left figure is a schematic diagram of impact of the common phase error on the modulation order constellation points, and the middle figure and the right figure are respectively schematic diagrams of impact of inter-carrier interference of 64QAM and 256QAM on the modulation order constellation points after CPE compensation. It can be seen from the rightmost figure that because of the inter-carrier interference, it is relatively difficult to distinguish between the constellation points of 256QAM.

In the prior art, a demodulation reference signal (DMRS) and a phase compensation reference signal (PCRS) (which may also be referred to as a phase tracking reference signal (PTRS)), where currently there is no uniform name in the industry, and the signal is collectively referred to as the PTRS subsequently) are used to complete channel estimation, phase noise estimation, and data demodulation together for both uplink and downlink. The DMRS is used for channel estimation and data demodulation, and the PTRS is used for tracking a residual phase error. FIG. 3 is a schematic configuration diagram of a phase tracking reference signal (the reference signal may also be referred to as a pilot) according to the prior art. The PTRS may not be sent, or may be sent on subcarriers of a port 60 and/or a port 61. PTRSs are set at an interval of 48 subcarriers, have a fixed time-frequency density, and are evenly distributed on a bandwidth. A null subcarrier is configured for orthogonality between the port 60 and the port 61.

It can be learned that in the prior art, during PTRS configuration, impact of inter-carrier interference caused by phase deviation on performance of a high-frequency communications system is hardly considered. When a modulation order is relatively high or a modulation and coding scheme is relatively high, the inter-carrier interference of the high-frequency communications system cannot be accurately estimated, and a bit error rate is high, resulting in low spectrum efficiency. In addition, if the inter-carrier interference of the high-frequency communications system is estimated in any case, overheads of a resource unit configured for estimating the inter-carrier interference are very high, causing relatively low spectrum efficiency.

Therefore, a solution for flexibly setting a resource unit urgently needs to be provided.

SUMMARY

This application provides a resource unit setting method, a resource unit transmission method, and an apparatus to improve spectrum efficiency.

According to an aspect of this application, a resource unit setting method is provided, including: setting, by a transmit end device based on a setting threshold of a null resource unit and/or a scheduling parameter, a plurality of null resource units at time domain and/or frequency domain locations associated with phase tracking reference signal resource units of one or more orthogonal frequency division multiplexing (OFDM) symbols; and sending, by the transmit end device, the one or more OFDM symbols. In this embodiment, the null resource unit is set based on the setting threshold of the null resource unit. Demodulation accuracy of a high-frequency communications system is ensured, and overheads of the null resource unit are as low as possible, thereby improving spectrum efficiency.

In one embodiment, the transmit end device is a network device, and before the sending, by the transmit end device, the one or more OFDM symbols, the method further includes: sending, by the transmit end device, at least one type of the following signaling, where the at least one type of signaling includes the setting threshold of the null resource unit and/or the scheduling parameter, and the at least one type of the following signaling includes radio resource control signaling, downlink control information, and/or a media access control control element. In this embodiment, the network device may configure the setting threshold of the null resource unit and/or the scheduling parameter for a terminal device by using signaling, so that the terminal device can determine, based on the setting threshold and/or the scheduling parameter, whether a null resource unit is set on the OFDM symbol sent by the network device.

In another embodiment, if the transmit end device is a terminal device, the terminal device sends a recommended setting threshold of the null resource unit to a network device, so that the network device can confirm, by using signaling, the setting threshold of the null resource unit that is recommended by the terminal device.

According to another aspect of this application, a resource unit transmission method is provided, including: receiving, by a receive end device, one or more OFDM symbols from a transmit end device, where a plurality of null resource units are set at time domain and/or frequency domain locations associated with phase tracking reference signal resource units of the one or more OFDM symbols; and obtaining, by the receive end device, received signals on the plurality of null resource units. In this embodiment, the received signal on the null resource unit can be accurately obtained based on the time domain and/or frequency domain location of the null resource unit relative to the phase tracking reference signal.

In one embodiment, the method further includes: estimating, by the receive end device, inter-carrier interference based on the obtained received signals on the plurality of null resource units. In this embodiment, the inter-carrier interference can be accurately estimated based on the received signal on the null resource unit, thereby improving demodulation accuracy of a high-frequency communications system.

In another embodiment, the receive end device is a terminal device, and before the receiving, by a receive end device, one or more OFDM symbols from a transmit end device, the method further includes: receiving, by the receive end device, at least one type of the following signaling, where the at least one type of signaling includes a setting threshold of the null resource unit and/or a scheduling parameter, and the at least one type of the following signaling includes radio resource control signaling, downlink control information, and/or a media access control control element. In this embodiment, the terminal device needs to obtain the setting threshold of the null resource unit and the scheduling parameter that are configured by a network device.

In still another possible implementation, before the receiving, by a receive end device, one or more OFDM symbols from a transmit end device, the method further includes: determining, by the receive end device based on the setting threshold of the null resource unit and/or the scheduling parameter, whether a null resource unit is set at the time domain and/or frequency domain locations associated with the phase tracking reference signal resource units of the one or more OFDM symbols; and if the plurality of null resource units are set at the time domain and/or frequency domain locations associated with the phase tracking reference signal resource units of the one or more OFDM symbols, performing the operation of obtaining, by the receive end device, received signals on the plurality of null resource units. In this embodiment, the terminal device receives the setting threshold of the null resource unit and/or the scheduling parameter that are/is configured by the network device by using signaling. The receive end device determines, based on the setting threshold of the null resource unit and/or the scheduling parameter, whether a null resource unit is set at the time domain and/or frequency domain locations associated with the phase tracking reference signal resource units of the one or more OFDM symbols. In one embodiment of one aspect or another aspect of this application, power of the null resource unit is zero. In this embodiment, the null resource unit may be a null phase tracking reference signal, a vacant resource unit, a vacant subcarrier, a vacant phase tracking reference signal, a zero power resource unit, a null subcarrier, a zero power phase tracking reference signal, a zero power subcarrier, or the like.

In another embodiment of one aspect or another aspect of this application, the setting threshold of the null resource unit includes at least one of the following thresholds: a modulation and coding scheme threshold, a scheduling bandwidth threshold, and a modulation order threshold; and the scheduling parameter includes at least one of the following: a modulation and coding scheme, a scheduling bandwidth, and a modulation order.

In still another possible implementation of one aspect or another aspect of this application, the setting, by a transmit end device based on a setting threshold of a null resource unit and/or a scheduling parameter, a plurality of null resource units at time domain and/or frequency domain locations associated with phase tracking reference signal resource units of one or more OFDM symbols specifically includes at least one of the following operations: if a modulation and coding scheme used by the transmit end device is greater than or equal to the modulation and coding scheme threshold, setting, by the transmit end device, the plurality of null resource units at the time domain and/or frequency domain locations associated with the phase tracking reference signal resource units of the one or more OFDM symbols; if a scheduling bandwidth used by the transmit end device is greater than or equal to the scheduling bandwidth threshold, setting, by the transmit end device, the plurality of null resource units at the time domain and/or frequency domain locations associated with the phase tracking reference signal resource units of the one or more OFDM symbols; and/or if a modulation order used by the transmit end device is greater than or equal to the modulation order threshold, setting, by the transmit end device, the plurality of null resource units at the time domain and/or frequency domain locations associated with the phase tracking reference signal resource units of the one or more OFDM symbols. In this embodiment, inter-carrier interference caused by different phase noise levels is different. When other conditions are the same, a worse phase noise level indicates greater inter-carrier interference caused and greater impact on a signal, and indicates that the (modulation and coding scheme) MCS threshold, the modulation order threshold, and the like need to be set lower. Different working frequencies have different phase noise levels. A higher frequency indicates a worse phase noise level. Therefore, in this case, the MCS threshold, the adjustment order threshold, and the like need to be set even lower. The phase noise has different inter-carrier interference on different subcarrier spacings. When other conditions are the same, a greater subcarrier spacing indicates less inter-carrier interference, and indicates that the MCS threshold, the adjustment order threshold, and the like may be set higher. The setting of the scheduling bandwidth threshold is determined based on impact of overheads of a null resource unit and a PTRS resource unit and performance improvement of setting the null resource unit on an overall spectrum.

In still another possible implementation of one aspect or another aspect of this application, the setting a plurality of null resource units at time domain locations associated with phase tracking reference signal resource units of one or more OFDM symbols includes: determining, based on a correspondence between a time domain density of the null resource unit and the scheduling parameter, a time domain density of a null resource unit corresponding to a scheduling parameter used by the transmit end device; and setting the null resource unit based on the determined time domain density of the null resource unit, where the time domain density of the null resource unit is less than or equal to a time domain density of a phase tracking reference signal. In this embodiment, a time domain location of the null resource unit is determined. A PTRS definitely exists on an OFDM symbol on which a null resource unit is set, and a null resource unit is not necessarily set on an OFDM symbol on which a PTRS exists.

In still another possible implementation of one aspect or another aspect of this application, the setting a plurality of null resource units at frequency domain locations associated with phase tracking reference signal resource units of one or more OFDM symbols includes: setting N null resource units on one adjacent side or two adjacent sides of frequency-division phase tracking reference signal resource units of the one or more OFDM symbols, where N is a positive integer greater than or equal to 2, a total quantity M of null resource units on one OFDM symbol in the scheduling bandwidth is a specified constant, or is determined based on a quantity of phase tracking reference signal resource units on one OFDM symbol in the scheduling bandwidth, and a location of the phase tracking reference signal on which the null resource unit is set on one OFDM symbol in the scheduling bandwidth may be pre-defined, or M best locations may be selected based on a channel condition. In this embodiment, the frequency domain location of the null resource unit and a quantity of null resource units in frequency domain are determined.

In still another possible implementation of one aspect or another aspect of this application, N null resource units are set at a frequency domain location associated with the PTRS resource unit, and power of the PTRS resource unit on one OFDM symbol in the scheduling bandwidth is N+1 times power of a single resource unit. In this embodiment, to ensure power consistency on one OFDM symbol, power allocated to the null resource unit is adjusted to a PTRS resource unit associated with a frequency domain location of the null resource unit, thereby improving power of the PTRS resource.

According to still another aspect of this application, a transmit end device is provided, and the transmit end device has a function of implementing behavior of the transmit end device in the foregoing method. The function may be implemented by hardware or may be implemented by hardware executing corresponding software. The hardware or the software includes one or more modules corresponding to the foregoing function.

In one embodiment, the transmit end device includes: a setting unit, configured to set, based on a setting threshold of a null resource unit and/or a scheduling parameter, a plurality of null resource units at time domain and/or frequency domain locations associated with phase tracking reference signal resource units of one or more OFDM symbols; and a sending unit, configured to send the one or more OFDM symbols.

In another embodiment, the transmit end device includes a receiver, a transmitter, a memory, and a processor. The memory stores a group of program code, and the processor is configured to invoke the program code stored in the memory to perform the following operations: setting, based on the setting threshold of the null resource unit and/or the scheduling parameter, the plurality of null resource units at the time domain and/or frequency domain locations associated with the phase tracking reference signal resource units of the one or more OFDM symbols; and controlling the transmitter to send the one or more OFDM symbols.

Based on a same inventive concept, for a problem resolving principle and beneficial effects of the apparatus, refer to the foregoing possible method implementations of the transmit end device and the beneficial effects brought about. Therefore, for implementation of the apparatus, refer to the implementation of the methods, and details are not repeated herein.

According to yet another aspect, a receive end device is provided, and the receive end device has a function of implementing behavior of the receive end device in the foregoing method. The function may be implemented by hardware or may be implemented by hardware executing corresponding software. The hardware or the software includes one or more modules corresponding to the foregoing function.

In one embodiment, the receive end device includes: a receiving unit, configured to receive one or more OFDM symbols from a transmit end device, where a plurality of null resource units are set at time domain and/or frequency domain locations associated with phase tracking reference signal resource units of the one or more OFDM symbols; and an obtaining unit, configured to obtain received signals on the plurality of null resource units.

In another embodiment, the receive end device includes a receiver, a transmitter, a memory, and a processor. The memory stores a group of program code, and the processor is configured to invoke the program code stored in the memory to perform the following operations: receiving, by using the receiver, one or more OFDM symbols from a transmit end device, where a plurality of null resource units are set at time domain and/or frequency domain locations associated with phase tracking reference signal resource units of the one or more OFDM symbols; and obtaining received signals on the plurality of null resource units.

Based on a same inventive concept, for a problem resolving principle and beneficial effects of the apparatus, refer to the foregoing possible method implementations of the receive end device and the beneficial effects brought about. Therefore, for implementation of the apparatus, refer to the implementation of the methods, and details are not repeated herein.

Still another aspect of this application provides a computer readable storage medium. The computer readable storage medium stores an instruction, and when the instruction is run on a computer, the computer is enabled to perform the methods in the foregoing aspects.

Still another aspect of this application provides a communications chip, where the communications chip stores an instruction, and when the instruction is run on a network device or a terminal device, a computer is enabled to perform the methods in the foregoing aspects.

Still another aspect of this application provides a computer program product that includes an instruction. When the instruction is run on a computer, the computer is enabled to perform the methods in the foregoing aspects.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

A communications system in the embodiments of the present invention includes a network device and a terminal device. The communications system may be a global system for mobile communications (GSM), a code division multiple access (CDMA) system, and a wideband code division multiple access (WCDMA) system, a worldwide interoperability for microwave access (WiMAX) system, a long term evolution (LTE) system, a 5G communications system (for example, a new radio (NR) system, a communications system that integrates a plurality of communications technologies (for example, a communications system integrating an LTE technology and an NR technology), or a subsequent evolved communications system.

The terminal device in the embodiments of the present invention is a device that has a wireless communication function, and may be a handheld device that has a wireless communication function, a vehicle-mounted device, a wearable device, a computing device, another processing device connected to a wireless modem, or the like. In different networks, the terminal device may be referred to as different names, for example, user equipment (UE), an access terminal, a subscriber unit, a user station, a mobile station, a mobile console, a remote station, a remote terminal, a mobile device, a user terminal, a terminal, a wireless communication device, a user agent or a user apparatus, a cellular phone, a cordless phone, a session initiation protocol (SIP) phone, a wireless local loop (WLL) station, a personal digital assistant (PDA), a 5G network, or a terminal device in a future evolved network.

The network device in the embodiments of the present invention is a device deployed on a radio access network to provide a wireless communication function, and includes but is not limited to: a base station (for example, a BTS (BTS), a NodeB (NB), an evolved NodeB (eNB or eNodeB), a transmission node or a transmission reception point (TRP or TP) in an NR system, a next-generation NodeB (gNB), or a base station or a network device in a future communications network), a relay node, an access point, a vehicle-mounted device, a wearable device, a wireless fidelity (Wi-Fi) station, a wireless backhaul node, a small cell, a micro station, or the like.

Figure 1:
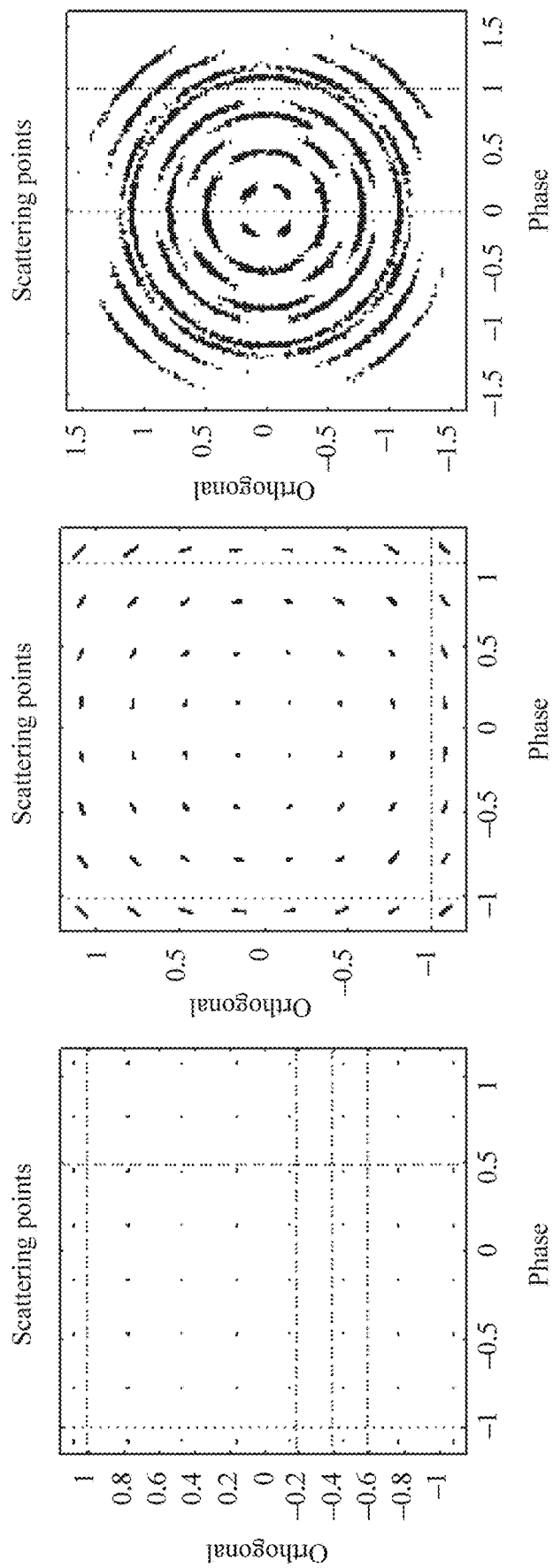
FIG. 1 is a schematic diagram of impact of different phase noises on constellation points.
Figure 2:
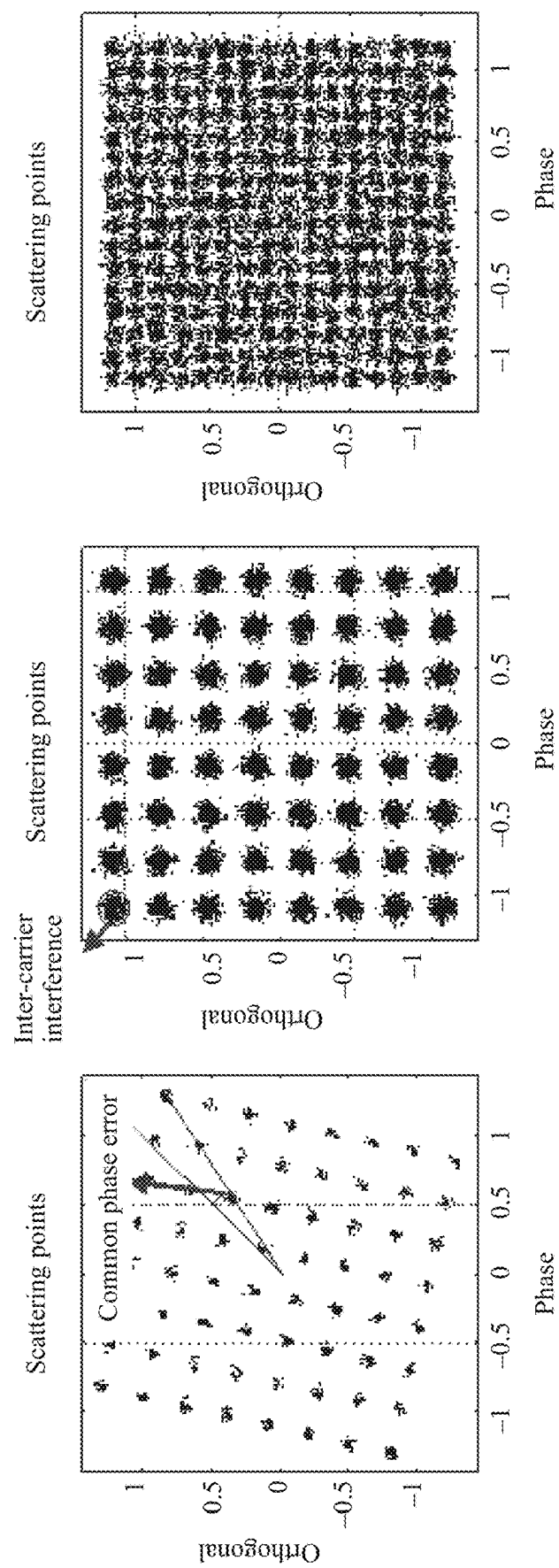
FIG. 2 is a schematic diagram of impact of a common phase error and inter-carrier interference on modulation order constellation points.
Figure 3:
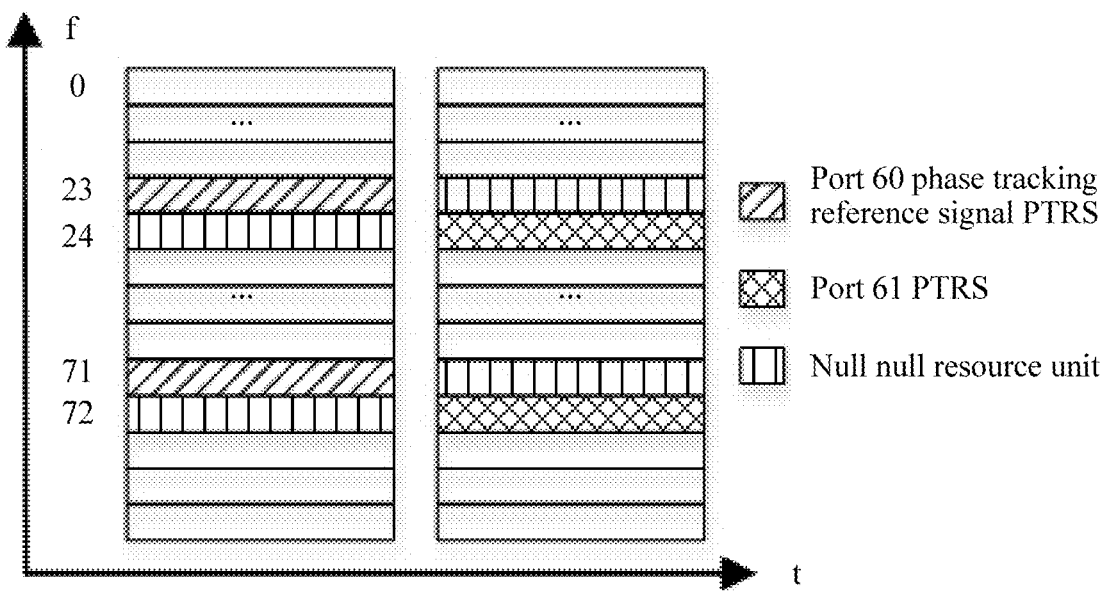
FIG. 3 is a schematic configuration diagram of a phase tracking reference signal according to the prior art.
Figure 4:
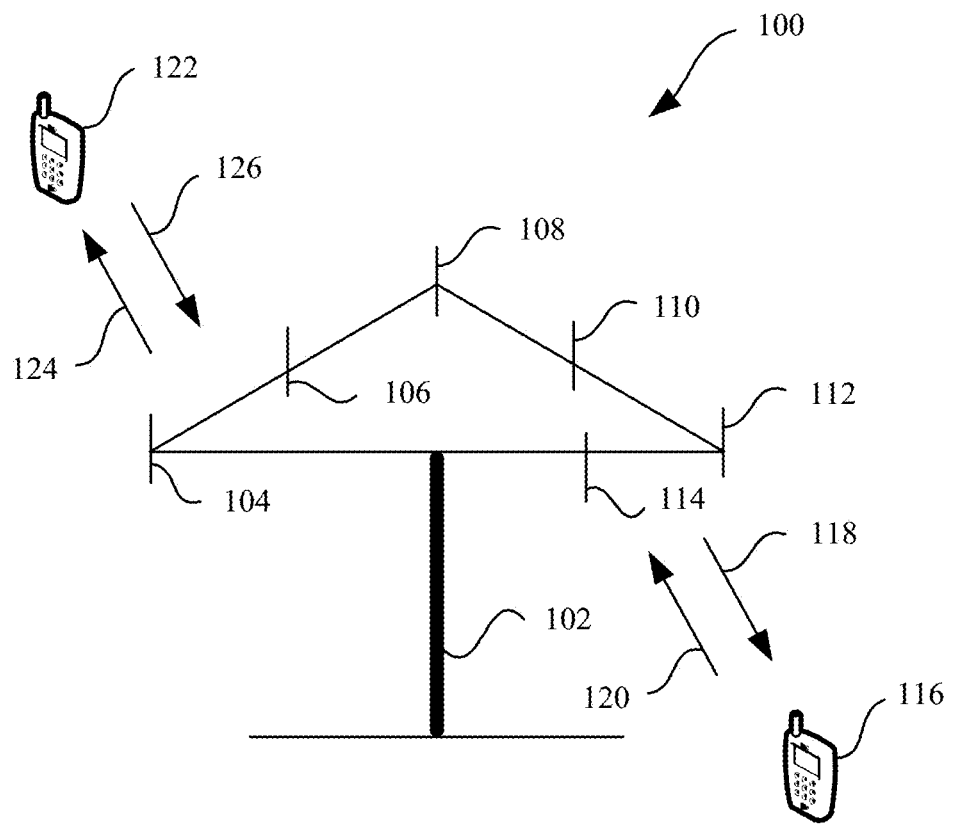
FIG. 4 is an example of a schematic architectural diagram of a communications system according to an embodiment of the present invention.

For example, the network device is a base station. FIG. 4 is an example of a schematic architectural diagram of a communications system according to an embodiment of the present invention. In FIG. 4, a base station 102 may include a plurality of antenna groups. Each antenna group may include one or more antennas. For example, one antenna group may include antennas 104 and 106, another antenna group may include antennas 108 and 110. In addition, an additional group may be further included, and the additional group may include antennas 112 and 114. Different antenna groups in high-frequency communication may be combined into different antenna planes (panel). For example, one antenna group forms one beam in one direction, and another antenna group forms another beam in another direction. To cooperate with different device capabilities, more antennas may be required. Therefore, based on different device capabilities, the additional group may have different quantity of antennas. For example, two antennas are shown for each antenna group in FIG. 4. However, each group may have more or fewer antennas. The base station 102 may additionally include a transmitter chain and a receiver chain. A person of ordinary skill in the art may understand that the transmitter chain and the receiver chain each may include a plurality of components, such as a processor, a modulator, a multiplexer, a demodulator, a demultiplexer, or an antenna, related to signal sending and receiving.

The base station 102 may communicate with one or more terminal devices, such as a terminal device 116 and a terminal device 122. However, it may be understood that the base station 102 may communicate with any quantity of terminal devices similar to the terminal device 116 or 122. As shown in FIG. 4, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126. In a frequency division duplex (FDD) system, for example, the forward link 118 may use a frequency band different from that used by the reverse link 120, and the forward link 124 may use a frequency band different from that used by the reverse link 126. In addition, in a time division duplex (TDD) system, the forward link 118 and the reverse link 120 may use a same frequency band, and the forward link 124 and the reverse link 126 may use a same frequency band.

An area covered by each group of antennas designed for communication and/or an area covered by transmission is referred to as a sector of the base station 102. For example, an antenna group may be designed to communicate with a terminal device in the sector of the coverage area of the base station 102. In a process in which the base station 102 communicates with the terminal devices 116 and 122 through the forward links 118 and 124 respectively, a transmit antenna of the base station 102 may improve signal-to-noise ratios of the forward links 118 and 124 by using beamforming. In addition, in comparison with a manner of sending, by a base station, a signal to all access terminal devices of the base station by using a single antenna, when the base station 102 sends, by using beamforming, a signal to the terminal devices 116 and 122 that are randomly dispersed in a related coverage area, a mobile node in a neighboring cell suffers less interference.

In a given time, the base station 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain, for example, generate, receive from another communications apparatus, or store in a memory, a specific quantity of data bits that need to be sent to the wireless communication receiving apparatus through a channel. The data bits may be included in a transport block or a plurality of transport blocks of data, and the transport block may be segmented to generate a plurality of code blocks.

It should be noted that the terms "system" and "network" may be used interchangeably in the embodiments of the present invention. The term "a plurality of" means "at least two". In view of this, "a plurality of" can be understood as "at least two" in the embodiments of the present invention. The term "and/or" describes an association for associated objects and represents that three relationships may exist. For example, A and/or B may represent the following three cases: Only A exists, both A and B exist, and only B exists. In addition, the character "/" generally represents an "or" relationship between the associated objects unless specified otherwise.

The embodiments of the present invention provide a resource unit setting method, a resource unit transmission method, and an apparatus. A null resource unit is set based on a setting threshold of the null resource unit. Demodulation accuracy of a high-frequency communications system is ensured, and overheads of the null resource unit are as low as possible, thereby improving spectrum efficiency.

Figure 5:
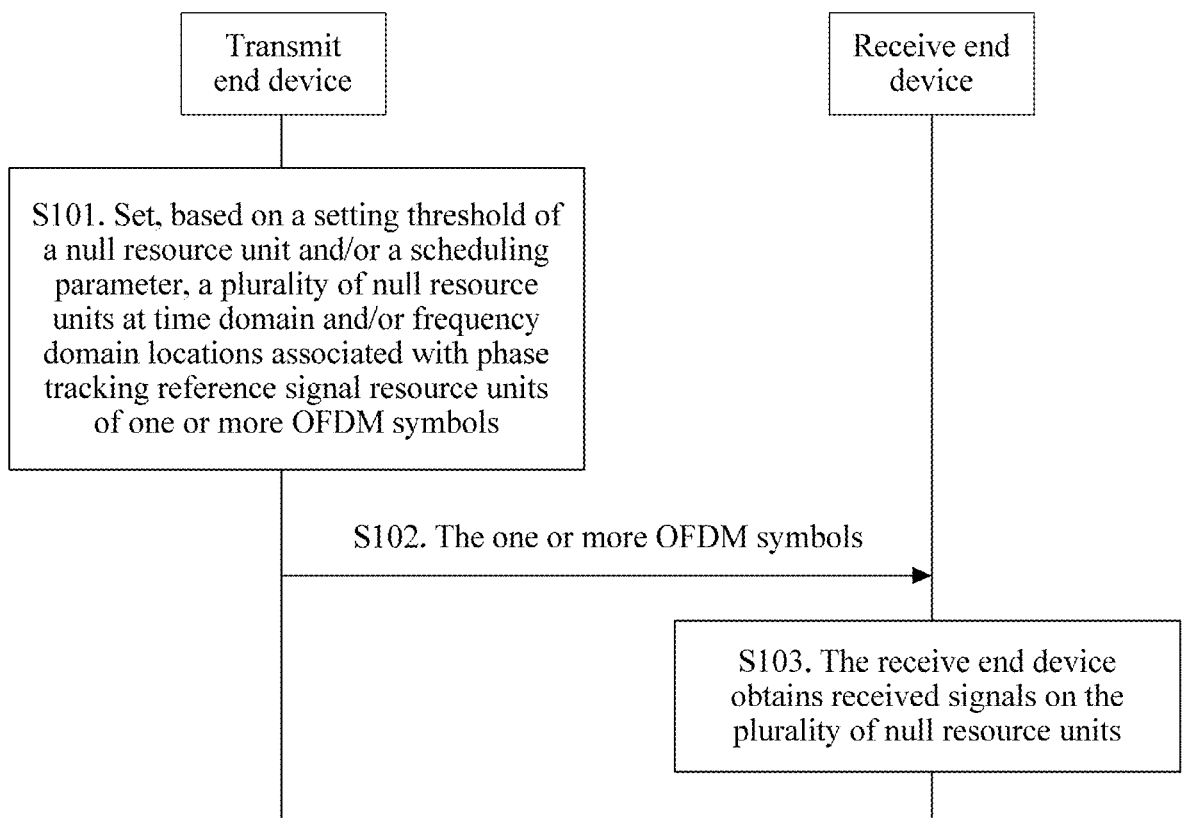
FIG. 5 is a schematic interaction flowchart of a resource unit setting method and a resource unit transmission method according to an embodiment of the present invention.

FIG. 5 is a schematic interaction flowchart of a resource unit setting method and a resource unit transmission method according to an embodiment of the present invention. The method may include the following operations:

Operation S101. A transmit end device sets, based on a setting threshold of a null resource unit and/or a scheduling parameter, a plurality of null resource units at time domain and/or frequency domain locations associated with phase tracking reference signal resource units of one or more orthogonal frequency division multiplexing (OFDM) symbols.

Operation S102. The transmit end device sends the one or more OFDM symbols.

A receive end device receives the one or more OFDM symbols from the transmit end device.

Operation S103. The receive end device obtains received signals on the plurality of null resource units.

In this embodiment of the present invention, the transmit end device may be a network device, and the receive end device is a terminal device. Alternatively, the transmit end device may be a terminal device, and the receive end device is a network device.

In consideration that inter-carrier interference caused by phase deviation has relatively great impact on communication performance only in a case of a high modulation and coding scheme (MCS), a high modulation order, or the like, if a null resource unit is set in each time of communication or set on each PTRS resource unit, overheads are excessively high. Therefore, this embodiment of the present invention needs to ensure demodulation accuracy of a high-frequency communications system, and minimize overheads of the null resource unit, so as to improve spectrum efficiency. Therefore, the transmit end device sets the null resource unit based on the setting threshold of the null resource unit and/or the scheduling parameter.

In this embodiment of the present invention, the setting threshold of the null resource unit includes at least one of the following thresholds: a modulation and coding scheme threshold, a scheduling bandwidth threshold, and a modulation order threshold. The scheduling parameter includes at least one of the following: a modulation and coding scheme, a scheduling bandwidth, and a modulation order.

It should be noted that, in specific execution of operation S101, setting the null resource unit by using the setting threshold of the null resource unit and/or the scheduling parameter may be understood as follows: The null resource unit is set based on the threshold of the null resource unit, the scheduling parameter is obtained by default, and the scheduling parameter is compared with a corresponding resource unit setting threshold.

It may be further understood as follows: The null resource unit is set based on the scheduling parameter, the setting threshold of the null resource unit is known or obtained by default, and the scheduling parameter is compared with a corresponding setting threshold of the null resource unit.

It may be further understood as follows: The null resource unit is set based on the setting threshold of the null resource unit and the scheduling parameter, that is, the scheduling parameter is compared with a corresponding threshold of the null resource unit.

In addition, in this embodiment of the present invention, power of the null resource unit is zero. The null resource unit may be or may be referred to as a null PTRS, a vacant resource unit, a vacant subcarrier, a vacant PTRS, a zero power resource unit, a null subcarrier, a zero power PTRS, a zero power subcarrier, or the like.

It should be noted that the plurality of null resource units herein are described at a granularity of resource unit. Certainly, the plurality of null resource units set beside one PTRS may alternatively be considered as a whole.

Phase noise levels of terminal devices may be different, and inter-carrier interference introduced by the different phase noise levels is different. Therefore, setting thresholds of null resource units of different terminal devices may be different.

Specifically, an MCS threshold, a modulation order threshold, and the like are set based on factors such as a phase noise level, a working frequency, and a subcarrier spacing. Specifically, inter-carrier interference caused by different phase noise levels is different. When other conditions are the same, a worse phase noise level indicates greater inter-carrier interference caused and greater impact on a signal, and indicates that the MSC threshold, the adjustment order threshold, and the like need to be set lower. Different working frequencies have different phase noise levels. A higher frequency indicates a worse phase noise level. Therefore, in this case, the MSC threshold, the adjustment order threshold, and the like need to be set even lower. The phase noise has different inter-carrier interference on different subcarrier spacings. When other conditions are the same, a greater subcarrier spacing indicates less inter-carrier interference, and indicates that the MSC threshold, the adjustment order threshold, and the like may be set higher.

Figure 6:
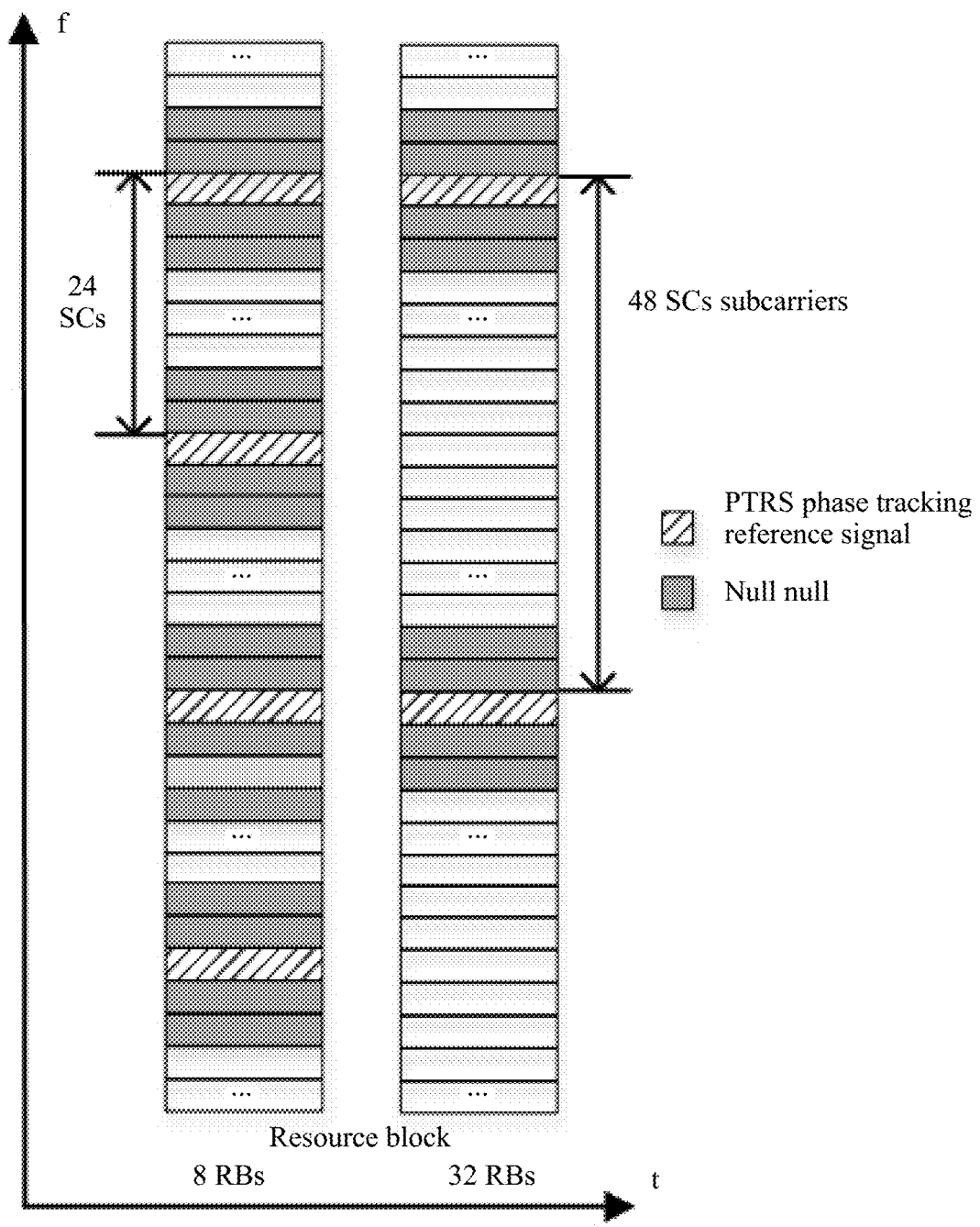
FIG. 6 is an example of a schematic diagram of distribution of a PTRS and a null resource unit in two types of scheduling bandwidths.

The scheduling threshold needs to be set in consideration of overheads of resource units used to perform common phase error estimation and inter-carrier interference estimation. This is because overheads of the PTRS are relatively high when the scheduling bandwidth is relatively small. FIG. 6 is a schematic diagram of distribution of a PTRS and a null resource unit in two scheduling bandwidths. It is assumed that an MCS threshold of the null resource unit is set to be relatively high, and a time domain density of a PTRS corresponding to the MCS threshold of the null resource unit is 1. As shown in the left figure, when the scheduling bandwidth is eight resource blocks, a frequency domain density of the PTRS is 1/24 (one PTRS is mapped every 24 subcarriers). As shown in the right figure, when the scheduling bandwidth is 32 resource blocks, a frequency domain density of the PTRS is 1/48. If four null resource units are configured in a small bandwidth such as eight resource blocks, total overheads that data cannot be placed (that is, the PTRS and the null resource units are placed) increases significantly to 5/24. However, a performance gain brought by introducing the null resource unit may be less than the overheads. Therefore, it is improper to configure the null resource unit in this case. Herein, both the scheduling bandwidth and the scheduling bandwidth threshold may be understood as a quantity of resource blocks.

Therefore, operation S101 specifically includes at least one of the following operations:

If a modulation and coding scheme used by the transmit end device is greater than or equal to the modulation and coding scheme threshold, the transmit end device sets the plurality of null resource units at the time domain and/or frequency domain locations associated with the phase tracking reference signal resource units of the one or more OFDM symbols;

if a scheduling bandwidth used by the transmit end device is greater than or equal to the scheduling bandwidth threshold, the transmit end device sets the plurality of null resource units at the time domain and/or frequency domain locations associated with the phase tracking reference signal resource units of the one or more OFDM symbols; and if a modulation order used by the transmit end device is greater than or equal to the modulation order threshold, the transmit end device sets the plurality of null resource units at the time domain and/or frequency domain locations associated with the phase tracking reference signal resource units of the one or more OFDM symbols.

If the transmit end device is a network device, the threshold is fed back or suggested by the terminal device, and confirmed or set by the network device by using at least one type of the following signaling: radio resource control signaling (RRC), downlink control information (DCI), and/or a media access control control element (MAC-CE).

Alternatively, the threshold may be pre-defined by the network device based on a phase noise model, a carrier frequency, a subcarrier spacing, and the like, that is, a setting threshold of a null resource unit corresponding to each type of phase noise model, each carrier frequency, and each subcarrier spacing is pre-defined. In this way, overheads for configuring the foregoing condition by using signaling are reduced. However, flexibility is reduced simultaneously. In addition, because the phase noise level changes with an environment, if a setting threshold of a current null resource unit does not match an actually required threshold, the setting threshold may be reconfigured by using signaling based on the setting threshold of the current null resource unit. A reconfigured value includes an absolute value and/or a relative value (a difference from the current value). Therefore, optionally, if the transmit end device is a network device, before operation S102, the following operations may be further included: The transmit end device sends at least one type of the following signaling, where the at least one type of signaling includes the setting threshold of the null resource unit and/or the scheduling parameter, and the at least one type of the following signaling includes radio resource control signaling, downlink control information, and a media access control control element. That is, the network device configures the setting threshold of the null resource unit for the terminal device. The setting threshold may be preconfigured. In this case, it is unnecessary to configure the setting threshold in each time of communication. The scheduling parameter may be notified to the terminal device in another manner, for example, the MCS and a scheduling bandwidth resource are notified in the DCI, and the modulation order may be determined based on a relationship between a scheduled MCS and the modulation order. Correspondingly, the following operation may be further included: The terminal device receives at least one type of the above signaling.

A configured location and quantity of the null resource unit are related to the PTRS resource unit. The location includes a time domain location and a frequency domain location.

The time domain location of the null resource unit is represented by a time domain density of the null resource unit. Specifically, setting a plurality of null resource units at time domain locations associated with phase tracking reference signal resource units of one or more OFDM symbols includes: determining, based on a correspondence between a time domain density of the null resource unit and the scheduling parameter, a time domain density of a null resource unit corresponding to a scheduling parameter used by the transmit end device; and setting the null resource unit based on the determined time domain density of the null resource unit, where the time domain density of the null resource unit is less than or equal to a time domain density of a phase tracking reference signal.

Specifically, the time domain density of the null resource unit may be configured implicitly or explicitly. That is, the explicit configuration means that the time domain density of the null resource unit is directly configured by using signaling. Configuring the time domain density of the null resource unit implicitly is specifically: establishing an association relationship between the time domain density and the scheduling parameter, and configuring the association relationship by using the signaling. A plurality of scheduling parameters may be corresponding to one type of time domain density, or one scheduling parameter may be corresponding to one type of time domain density. When a plurality of scheduling parameters are corresponding to one type of time domain density, one scheduling parameter range may be set, and the scheduling parameter range is determined by using the setting threshold of the null resource unit. For example, Table 1 shows an association relationship between the MCS scheme and the time domain density of the null resource unit.

TABLE 1

Association relationship between an MCS scheme and a time domain density of a null resource unit

| Scheduled MCS | Time domain density |
|---|---|
| $0 \leq MCS < T_{MCS}^1$ | 0 |
| $T_{MCS}^1 \leq MCS < T_{MCS}^2$ | N1 |
| $T_{MCS}^2 \leq MCS < T_{MCS}^3$ | N2 |
| $T_{MCS}^3 \leq MCS$ | N3 |

T represents an MCS threshold, and determines an MCS range corresponding to each time domain density of a null resource unit. N represents that there is a null resource unit on one symbol in each 1/N symbol, and N1≤N2≤N3.

The relationship described in the foregoing table may alternatively be represented as Formula (1):

$$D_T = \begin{cases} 0 & 0 \leq MCS < T_{MCS}^1 \\ N1 & T_{MCS}^1 \leq MCS < T_{MCS}^2 \\ N2 & T_{MCS}^2 \leq MCS < T_{MCS}^3 \\ N3 & T_{MCS}^3 \leq MCS \end{cases} \quad (1)$$

where $D_T$ represents a time domain density of a null resource unit.

Figure 7:
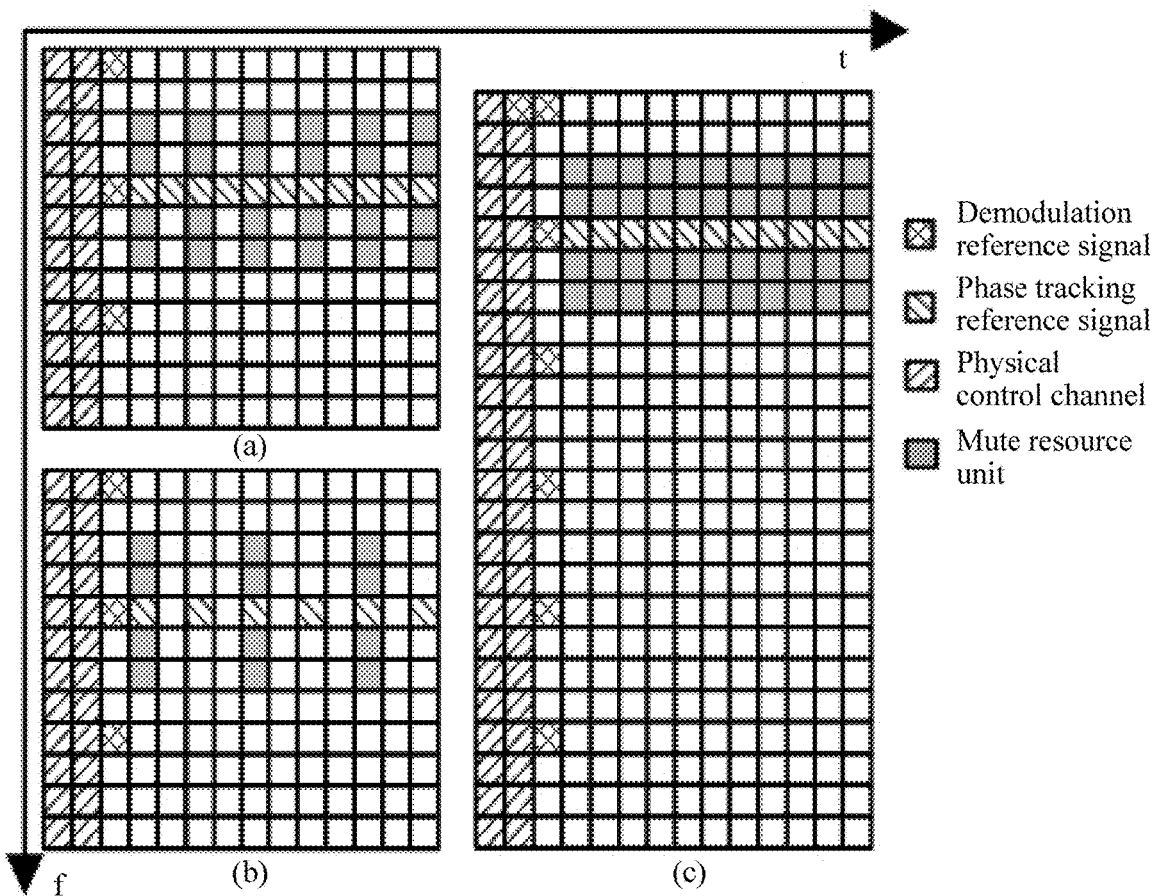
FIG. 7 is an example of a schematic diagram of a time domain location of a null resource unit.

For example, a time domain location of a null resource unit is specifically shown in FIG. 7. As shown in (a) in FIG. 7, a time domain density of a PTRS is 1, a frequency domain density of the PTRS is 1/12, and a time domain density of a null resource unit is 1/2. As shown in (b) in FIG. 7, a time domain density of a PTRS is 1/2, a frequency domain density of the PTRS is 1/12, and a time domain density of a null resource unit is 1/4. As shown in (c) in FIG. 7, a time domain density of a PTRS is 1, a frequency domain density of the PTRS is 1/24, and a time domain density of a null resource unit is 1.

It can be learned that, because inter-carrier interference estimation on a symbol needs to depend on a PTRS, a time domain density of a null resource unit is less than or equal to a time domain density of the PTRS. That is, a PTRS definitely exists on an OFDM symbol on which the null resource unit exists, and the null resource unit is not necessarily on an OFDM symbol on which a PTRS exists.

Figure 8:
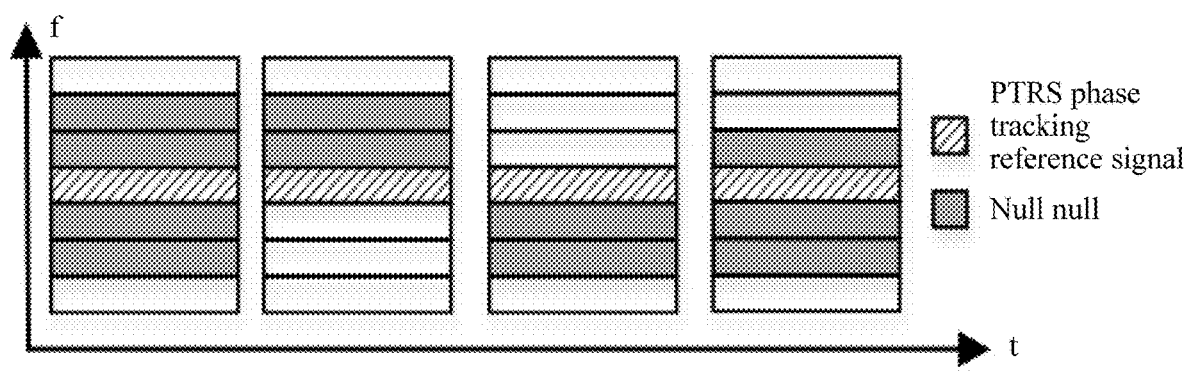
FIG. 8 is a schematic diagram of a frequency domain location of a null resource unit.

For the frequency domain locations of the null resource units, the null resource units may be evenly distributed on two adjacent sides of a frequency-division PTRS resource unit, distributed on one adjacent side of the frequency-division PTRS resource unit, or unevenly distributed on two adjacent sides of the frequency-division PTRS resource unit, as shown in the four figures in FIG. 8 respectively. A distribution location may be predefined or configured by using signaling. In addition, when the PTRS resource unit is on an edge of the scheduling bandwidth, if the null resource unit is mapped to two sides of the PTRS resource unit, no null resource unit is mapped to the edge side of the PTRS resource unit, and a quantity of null resource units corresponding to the PTRS resource unit is reduced by half. If the null resource unit is mapped to one side, and the side is the same as an edge direction, a mapping location is changed to the other side of the PTRS resource unit.

The quantity of null resource units is generally described in terms of frequency domain. In addition, there are two types of quantity: One is for a PTRS on which a null resource unit has been set, and the quantity of null resource units is N (N≥2); and the other is a total quantity M of null resource units on one OFDM symbol in an entire scheduling bandwidth. M may be a specified constant, or M is determined based on a quantity of PTRS resource units on one OFDM symbol in the scheduling bandwidth. That is, M=f (K), and M is a function of K, for example, M=1/2*K*N, where K is a total quantity of PTRSs on one OFDM symbol in the scheduling bandwidth. Specifically, M may be predefined, or M may be configured by using signaling. Optionally, the M null resource units may be set on resource units at a front part of the scheduling bandwidth, or to avoid setting the null resource unit beside the PTRS on the edge of the scheduling bandwidth, the M null resource units may be set on resource units at a middle part of the scheduling bandwidth, or may be set on resource units corresponding to a resource block with a relatively good channel condition. A specific selection may be predefined in a protocol or notified by using signaling. This is not limited in this embodiment of the present invention. In addition, M may be separately defined for different frequencies, different subcarrier spacings, and different phase noise models. For example, for a relatively poor phase noise model, a value of M may be higher than that for a relatively good phase noise model. In addition, because the phase noise level changes with an environment or a predefined value is not proper, the value of M may be reconfigured by using signaling. The signaling includes RRC, a MAC-CE, DCI, and the like. In consideration that the phase noise level changes slowly with the environment, RRC configuration may reduce configuration overheads.

In another embodiment, the quantity of null resource units may be one.

As described in operation S101, that a transmit end device sets, based on a setting threshold of a null resource unit and/or a scheduling parameter, a plurality of null resource units at time domain and/or frequency domain locations associated with phase tracking reference signal resource units of one or more OFDM symbols is specifically setting, based on the foregoing described content, the setting threshold of the null resource unit and/or the scheduling parameter and setting the null resource unit. After operation S101, the transmit end device sends the one or more OFDM symbols, and the receive end device receives the one or more OFDM symbols from the transmit end device. Then, as described in operation S103, the receive end device obtains received signals on the plurality of null resource units. For the receive end device, before operation S103, the following operation is further included: The receive end device determines, based on the setting threshold of the null resource unit and/or the scheduling parameter, whether a null resource unit is set at the time domain and/or frequency domain locations associated with the phase tracking reference signal resource units of the one or more OFDM symbols. If the plurality of null resource units are set at the time domain and/or frequency domain locations associated with the phase tracking reference signal resource units of the one or more OFDM symbols, operation S103 is performed. That is, the receive end device determines, based on the setting threshold of the null resource unit and/or the scheduling parameter, whether the transmit end device sets the null resource unit. If the receive end device determines that the transmit end device sets the null resource unit, the receive end device determines a time domain density of the corresponding null resource unit based on the scheduling parameter such as an MCS, a scheduling bandwidth, and a modulation order, so as to determine the time domain location of the null resource unit based on the time domain density; and determines the frequency domain location of the null resource unit based on predefined or sent signaling, so as to obtain the plurality of null resource units at the determined time domain and/or frequency domain location.

It should be noted that when the transmit end device transmits the OFDM symbol, there is no signal on the null resource unit. However, after spatial transmission, there may be an interference signal on the null resource unit received by the receive end device. Therefore, the following operation may be further included: The receive end device estimates inter-carrier interference based on the obtained received signals on the plurality of null resource units. A specific manner of inter-carrier interference estimation may be as follows: It is assumed that two null resource units are separately set on each side of one PTRS on one OFDM symbol. As shown in the left figure of FIG. 8, it is assumed that only first-order (that is, only an adjacent subcarrier is considered) interference is considered, a PTRS signal is A, and a data signal is D. Interference on subcarrier 3 is A*alfa1+noise, and interference on subcarrier 5 is A*alfa2+noise, where alfa is a first-order carrier interference coefficient, and a corresponding carrier interference coefficient alfa may be estimated by dividing a received signal (A*alfa1+noise, A*alfa2+noise) by a transmit signal A on subcarrier 4 or may be estimated by multiplying a received signal by a conjugate of the received signal.

When a mapped null resource unit is set at a frequency domain location associated with the PTRS, to ensure that power of an entire symbol is consistent, power of the null resource unit may be adjusted to the PTRS resource unit. Then, power of a PTRS resource unit on one OFDM symbol in a scheduling bandwidth is N+1 times that of a single resource unit, that is, power of the PTRS is Padjust=P*(N+1), where P represents power of a single resource unit, and N represents a quantity of null resource units that are set at a frequency domain location associated with the PTRS. Therefore, if a PTRS on which a null resource unit is set boosts power based on a quantity of null resource units configured at an associated location of the PTRS, more power boosted brings a more accurate common phase error estimated based on the PTRS, and brings more accurate inter-carrier interference estimated based on a null resource unit beside the PTRS. The final estimated CPE and ICI may be weighted by using power of the CPE and the ICI.

The embodiments of the present invention provide a resource unit setting method and a resource unit transmission method. A null resource unit is set based on a setting threshold of the null resource unit. Demodulation accuracy of a high-frequency communications system is ensured, and overheads of the null resource unit are as low as possible, thereby improving spectrum efficiency.

The foregoing describes in detail the methods in the embodiments of the present invention. The following provides an apparatus in the embodiments of the present invention.

Figure 9:
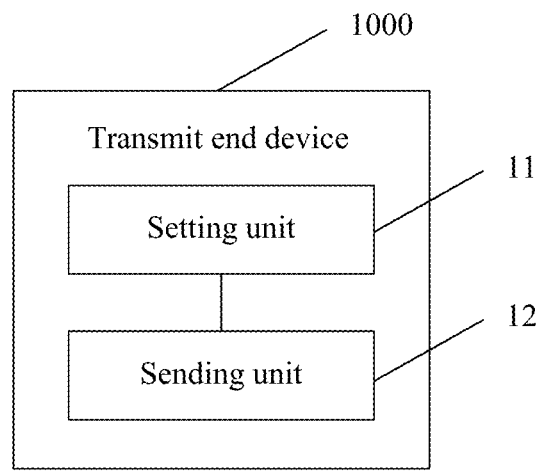
FIG. 9 is a schematic modular diagram of a transmit end device according to an embodiment of the present invention.

FIG. 9 is a schematic modular diagram of a transmit end device according to an embodiment of the present invention. The transmit end device may be applied to the communications system shown in FIG. 4. The transmit end device 1000 may include a setting unit 11 and a sending unit 12. The setting unit 11 is configured to set a null resource unit, for example, perform a part of operation S101. The sending unit 12 is configured to send an OFDM symbol, for example, perform a part of operation S102. For details, refer to the description in the method embodiments, and details are not described herein again.

According to the transmit end device provided in this embodiment of the present invention, the null resource unit is set based on a setting threshold of the null resource unit. Demodulation accuracy of a high-frequency communications system is ensured, and overheads of the null resource unit are as low as possible, thereby improving spectrum efficiency.

Figure 10:
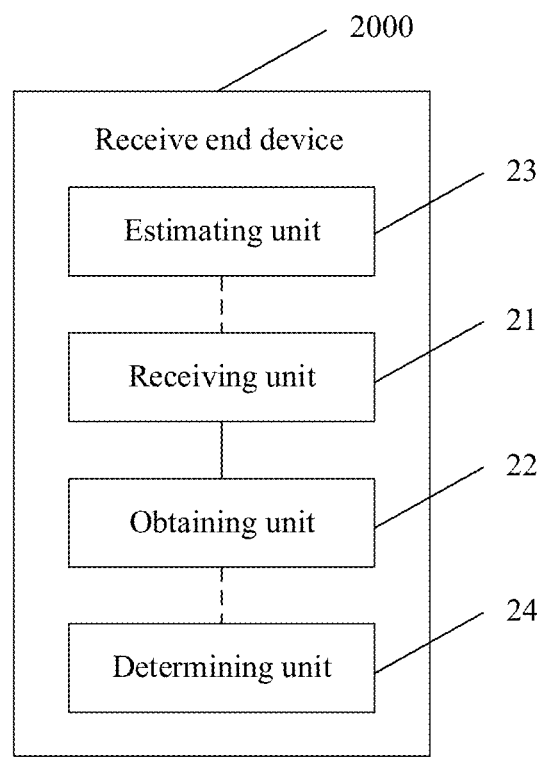
FIG. 10 is a schematic modular diagram of a receive end device according to an embodiment of the present invention.

FIG. 10 is a schematic modular diagram of a receive end device according to an embodiment of the present invention. The receive end device may be applied to the communications system shown in FIG. 4. The receive end device 2000 may include a receiving unit 21 and an obtaining unit 22, and may further include an estimation unit 23 and a determining unit 24. The receiving unit 21 is configured to receive an OFDM symbol, for example, perform a part of operation S102. The obtaining unit 22 is configured to obtain received signals on a plurality of null resource units, for example, perform a part of operation S103. The estimation unit 23 is configured to estimate inter-carrier interference based on the obtained received signals on the plurality of null resource units. The determining unit 24 is configured to determine, based on a setting threshold of the null resource unit and/or a scheduling parameter, whether a null resource unit is set at time domain and/or frequency domain locations associated with phase tracking reference signal resource units of the one or more OFDM symbols. For details, refer to the description in the method embodiments, and details are not described herein again.

According to the receive end device provided in this embodiment of the present invention, the null resource unit is set based on the setting threshold of the null resource unit. Demodulation accuracy of a high-frequency communications system is ensured, and overheads of the null resource unit are as low as possible, thereby improving spectrum efficiency.

An embodiment of the present invention further provides another transmit end device. The transmit end device may be the network device or the terminal device in the foregoing communications system. The transmit end device may use a hardware architecture shown in FIG. 11. The transmit end device may include a receiver, a transmitter, a memory, and a processor, and the receiver, the transmitter, the memory, and the processor are connected to each other through a bus. A related function implemented by the setting unit 11 in FIG. 9 may be implemented by the processor, and a related function implemented by the sending unit 12 may be implemented by the transmitter.

The memory includes but is not limited to a random access memory (RAM), a read-only memory (ROM), an erasable programmable read only memory (EPROM), or a compact disc read-only memory (CD-ROM). The memory is configured to store a related instruction and related data.

The receiver is configured to receive data and/or a signal, and the transmitter is configured to send data and/or a signal. The transmitter and the receiver may be independent components, or may be an integral component, such as a transceiver.

The processor may include one or more processors, for example, includes one or more central processing units (CPU). When the processor is one CPU, the CPU may be a single-core CPU, or may be a multi-core CPU.

The memory is configured to store program code and data of the transmit end device, and may be a separate component or integrated into the processor.

The foregoing components may be integrated into a chip for implementation, for example, integrated into a baseband chip for implementation.

Specifically, the processor is configured to set, based on a setting threshold of a null resource unit and/or a scheduling parameter, a plurality of null resource units at time domain and/or frequency domain locations associated with phase tracking reference signal resource units of one or more OFDM symbols, for example, perform a part of S101. In addition, the processor is further configured to control the transmitter to send the one or more OFDM symbols, for example, perform a part of S102. For details, refer to the description in the method embodiments, and details are not described herein again.

Figure 11:
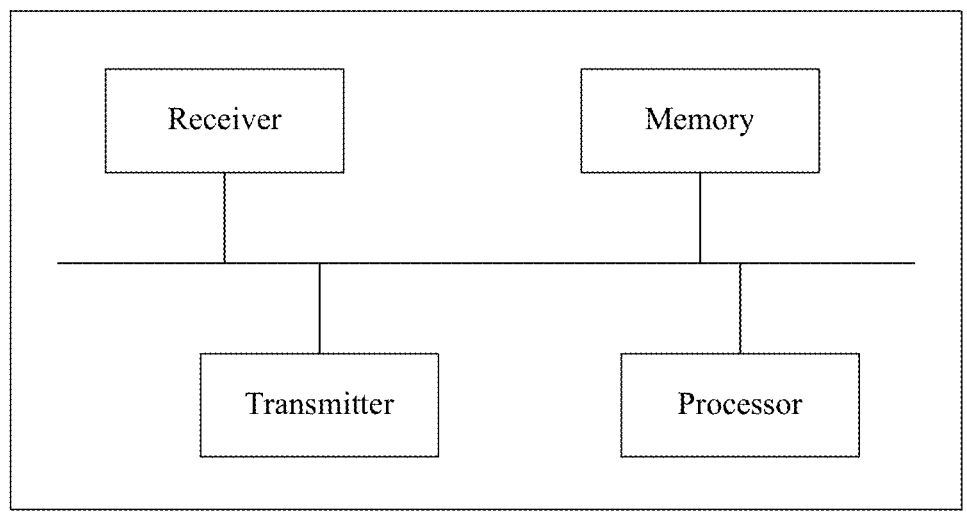
FIG. 11 is a schematic diagram of a hardware architecture of another transmit end device/receive end device according to an embodiment of the present invention.

It may be understood that FIG. 11 shows merely a simplified design of the transmit end device. In actual application, the transmit end device may further include another necessary element, including but not limited to any quantity of transceivers, processors, controllers, memories, and the like, and all transmit end devices that can implement this embodiment of the present invention fall within the protection scope of the present invention.

According to the transmit end device provided in this embodiment of the present invention, the null resource unit is set based on the setting threshold of the null resource unit. Demodulation accuracy of a high-frequency communications system is ensured, and overheads of the null resource unit are as low as possible, thereby improving spectrum efficiency.

An embodiment of the present invention further provides a receive end device. The receive end device may be the network device or the terminal device in the foregoing communications system. The receive end device may use the hardware architecture shown in FIG. 11. The receive end device may include a receiver, a transmitter, a memory, and a processor, and the receiver, the transmitter, the memory, and the processor are connected to each other through a bus. A related function implemented by the receiving unit 21 in FIG. 10 may be implemented by the receiver, and a related function implemented by the obtaining unit 22 may be implemented by the processor.

The memory includes but is not limited to a RAM, a ROM, an EPROM, or a CD-ROM, and the memory is configured to store a related instruction and related data.

The receiver is configured to receive data and/or a signal, and the transmitter is configured to send data and/or a signal. The transmitter and the receiver may be independent components, or may be an integral component, such as a transceiver.

The processor may include one or more processors, for example, includes one or more CPUs. When the processor is one CPU, the CPU may be a single-core CPU, or may be a multi-core CPU.

The memory is configured to store program code and data of the receive end device, and may be a separate component or integrated into the processor.

The foregoing components may be integrated into a chip for implementation, for example, integrated into a baseband chip for implementation.

Specifically, the processor is configured to control the receiver to receive one or more OFDM symbols from a transmit end device, for example, perform a part of operation S102, and the processor is further configured to obtain received signals on the plurality of null resource units, for example, perform a part of operation S103. In addition, the processor is further configured to estimate inter-carrier interference based on the obtained received signals on the plurality of null resource units; and the processor is further configured to determine, based on a setting threshold of the null resource unit and/or a scheduling parameter, whether a null resource unit is set at time domain and/or frequency domain locations associated with phase tracking reference signal resource units of the one or more OFDM symbols. For details, refer to the description in the method embodiments, and details are not described herein again.

It may be understood that FIG. 11 shows merely a simplified design of the receive end device. In actual application, the receive end device may further include another necessary element, including but not limited to any quantity of transceivers, processors, controllers, memories, and the like, and all receive end devices that can implement this embodiment of the present invention fall within the protection scope of the present invention.

According to the receive end device provided in this embodiment of the present invention, the null resource unit is set based on the setting threshold of the null resource unit. Demodulation accuracy of a high-frequency communications system is ensured, and overheads of the null resource unit are as low as possible, thereby improving spectrum efficiency.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or at least two units are integrated into one unit.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instruction may be stored in a computer readable storage medium, or may be transmitted by using the computer readable storage medium. The computer instruction may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the processes of the methods in the embodiments may be implemented by a computer program instructing related hardware. The program may be stored in the computer readable storage medium. When the program runs, the processes of the methods in the embodiments are included. The foregoing storage medium includes: media that can store program code, such as a read-only memory (ROM), a random access memory (RAM), a magnetic disk, or an optical disc.

What is claimed is:

1. A resource unit setting method, comprising:
   setting, by a transmit end device based on a setting threshold of a null resource unit and/or a scheduling parameter, a plurality of null resource units at time domain and frequency domain locations associated with phase tracking reference signal resource units of one or more orthogonal frequency division multiplexing (OFDM) symbols; and
   sending, by the transmit end device, the one or more OFDM symbols, wherein N null resource units are set at a frequency domain location associated with a phase tracking reference signal resource unit, and power of the phase tracking reference signal resource unit on one OFDM symbol in a scheduling bandwidth is approximately N+1 times power of a single null resource unit.

2. The resource unit setting method according to claim 1, wherein the setting threshold of the null resource unit comprises at least one of the following thresholds: a modulation and coding scheme threshold, a scheduling bandwidth threshold, and a modulation order threshold; and
   the scheduling parameter comprises at least one of the following: a modulation and coding scheme, a scheduling bandwidth, and a modulation order.

3. The resource unit setting method according to claim 2, wherein the setting, by a transmit end device based on a setting threshold of a null resource unit and/or a scheduling parameter, a plurality of null resource units at time domain and frequency domain locations associated with phase tracking reference signal resource units of one or more OFDM symbols comprises at least one of the following operations:
   if a modulation and coding scheme used by the transmit end device is greater than or equal to the modulation and coding scheme threshold, setting, by the transmit end device, the plurality of null resource units at the time domain and frequency domain locations associated with the phase tracking reference signal resource units of the one or more OFDM symbols;
   if a scheduling bandwidth used by the transmit end device is greater than or equal to the scheduling bandwidth threshold, setting, by the transmit end device, the plurality of null resource units at the time domain and frequency domain locations associated with the phase tracking reference signal resource units of the one or more OFDM symbols; or
   if a modulation order used by the transmit end device is greater than or equal to the modulation order threshold, setting, by the transmit end device, the plurality of null resource units at the time domain and frequency domain locations associated with the phase tracking reference signal resource units of the one or more OFDM symbols.

4. The resource unit setting method according to claim 1, wherein the transmit end device is a network device, and before the sending, by the transmit end device, the one or more OFDM symbols, the method further comprises:
   sending, by the transmit end device, at least one type of the following signaling to a terminal device, wherein the at least one type of signaling comprises the setting threshold of the null resource unit and/or the scheduling parameter, and the at least one type of the following signaling comprises radio resource control signaling, downlink control information, or a media access control control element.

5. The resource unit setting method according to claim 4, wherein the setting a plurality of null resource units at time domain locations associated with phase tracking reference signal resource units of one or more OFDM symbols comprises:
   determining, based on a correspondence between a time domain density of the null resource unit and the scheduling parameter, a time domain density of a null resource unit corresponding to a scheduling parameter used by the transmit end device; and
   setting the null resource unit based on the determined time domain density of the null resource unit; wherein
   the time domain density of the null resource unit is less than or equal to a time domain density of a phase tracking reference signal.

6. The resource unit setting method according to claim 1, wherein the setting a plurality of null resource units at frequency domain locations associated with phase tracking reference signal resource units of one or more OFDM symbols comprises:
   setting N null resource units on one adjacent side or two adjacent sides of frequency-division phase tracking reference signal resource units of the one or more OFDM symbols, wherein N is a positive integer greater than or equal to 2, and
   a total quantity M of null resource units on one OFDM symbol in a scheduling bandwidth is a specified constant, or is determined based on a quantity of phase tracking reference signal resource units on one OFDM symbol in the scheduling bandwidth.

7. A resource unit transmission method, comprising:
receiving, by a receive end device, signals representing one or more OFDM symbols from a transmit end device, wherein a plurality of null resource units are set at time domain and frequency domain locations associated with phase tracking reference signal resource units of the one or more OFDM symbols; and
obtaining, by the receive end device, received signals on the plurality of null resource units, wherein the plurality of null resource units includes N null resource units that are set at a frequency domain location associated with a phase tracking reference signal resource unit, and power of the phase tracking reference signal resource unit on one OFDM symbol in a scheduling bandwidth is approximately N+1 times power of a single null resource unit.

8. The resource unit transmission method according to claim 7, further comprising:
estimating, by the receive end device, inter-carrier interference based on the obtained received signals on the plurality of null resource units.

9. The resource unit transmission method according to claim 7, wherein the receive end device is a terminal device, and before the receiving, by a receive end device, one or more OFDM symbols from a transmit end device, the method further comprises:
receiving, by the receive end device, at least one type of the following signaling, wherein the at least one type of signaling comprises a setting threshold of a null resource unit and/or a scheduling parameter, and the at least one type of the following signaling comprises radio resource control signaling, downlink control information, or a media access control control element.

10. The resource unit transmission method according to claim 9, wherein before the receiving, by a receive end device, one or more OFDM symbols from a transmit end device, the method further comprises:
determining, by the receive end device based on the setting threshold of the null resource unit and/or the scheduling parameter, whether null resource units are set at the time domain and frequency domain locations associated with the phase tracking reference signal resource units of the one or more OFDM symbols; and
if a plurality of null resource units are set at the time domain and frequency domain locations associated with the phase tracking reference signal resource units of the one or more OFDM symbols, obtaining, by the receive end device, received signals on the plurality of null resource units.

11. A receive end device, comprising:
one or more processors; and
a receiver, wherein the receiver is configured to receive signals representing one or more OFDM symbols from a transmit end device, wherein a plurality of null resource units are set at time domain and frequency domain locations associated with phase tracking reference signal resource units of the one or more OFDM symbols; and
the one or more processors are configured to obtain received signals on the plurality of null resource units, wherein the plurality of null resource units includes N null resource units that are set at a frequency domain location associated with a phase tracking reference signal resource unit, and power of the phase tracking reference signal resource unit on one OFDM symbol in a scheduling bandwidth is approximately N+1 times power of a single null resource unit.

12. The receive end device according to claim 11, wherein the one or more processors are further configured to estimate inter-carrier interference based on the obtained received signals on the plurality of null resource units.

13. The receive end device according to claim 11, wherein the receiver is configured to: before receiving the one or more OFDM symbols from a transmit end device, receive at least one type of the following signaling, wherein the at least one type of signaling comprises a setting threshold of a null resource unit and/or a scheduling parameter, and the at least one type of the following signaling comprises radio resource control signaling, downlink control information, or a media access control control element, wherein the receive end device is a terminal device.

14. The receive end device according to claim 13, wherein the one or more processors are further configured:
to determine, based on the setting threshold of the null resource unit and/or the scheduling parameter, whether null resource units are set at the time domain and frequency domain locations associated with the phase tracking reference signal resource units of the one or more OFDM symbols; and
to obtain the received signals on the plurality of null resource units, if a plurality of null resource units are set at the time domain and frequency domain locations associated with the phase tracking reference signal resource units of the one or more OFDM symbols.

* * * * *